United States Patent [19]

Balter

[11] Patent Number: 4,629,219
[45] Date of Patent: Dec. 16, 1986

[54] ADJUSTABLE CONNECTOR UNIT

[75] Inventor: Valentin Balter, San Francisco, Calif.

[73] Assignee: Huntington Mechanical Laboratories, Inc., Mountain View, Calif.

[21] Appl. No.: 735,021

[22] Filed: May 17, 1985

[51] Int. Cl.⁴ ............................................. F16L 27/00
[52] U.S. Cl. .................................. 285/184; 285/276; 285/178; 285/912
[58] Field of Search .............. 285/272, 276, 184, 375, 285/279, DIG. 13, 178, 424, 912

[56] References Cited

U.S. PATENT DOCUMENTS

| | | | |
|---|---|---|---|
| 776,971 | 12/1904 | Walsh | 285/184 |
| 1,586,725 | 6/1926 | Westinghouse et al. | 285/279 |
| 3,300,977 | 1/1967 | Hoffman et al. | 285/276 |
| 3,418,809 | 12/1968 | Kopp | 285/184 |
| 3,501,174 | 3/1970 | Walker | 285/279 |
| 4,436,326 | 3/1984 | Peaster | 285/184 |

FOREIGN PATENT DOCUMENTS 483859  6/1952  Canada .............................. 285/276

Primary Examiner—Cornelius J. Husar
Assistant Examiner—Anthony Knight
Attorney, Agent, or Firm—Townsend and Townsend

[57] ABSTRACT

A connector unit for a number of different coupling applications such as for interconnecting a pair of pipes or other structural parts which must be mounted near each other and at an angle with respect to each other. The connector unit includes a pair of side members which are spaced apart and to which are mounted the structural parts to be interconnected. Each side member has a respective ring rotatably mounted thereon by a first set of balls, and the two rings are rotatably coupled to each other by a second set of balls. Each set of balls is in an annular race formed by a pair of mating grooves. The balls of each set are fed into a respective race through a hole in the respective ring, then the hole is plugged to keep the balls in place. The race between the two rings is inclined at an angle relative to the race between each side member and the respective ring. Thus, rotation of one ring relative to the other ring will cause a change in the angular orientation of the side members relative to each other without rotating the side members relative to each other and without allowing one side member to move toward or away from each other. A pair of gears can be provided to rotate each ring relative to its corresponding side member.

15 Claims, 8 Drawing Figures

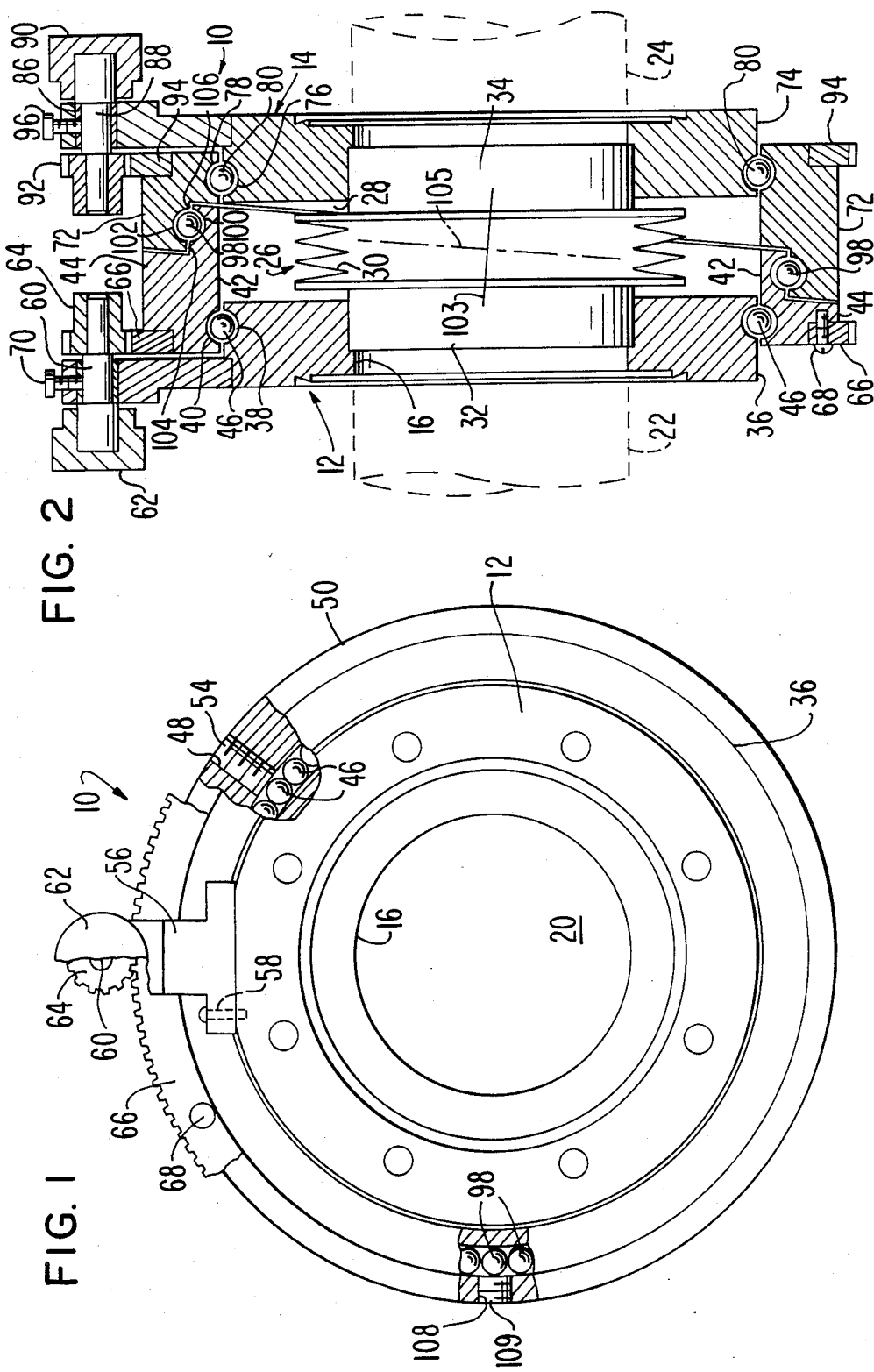

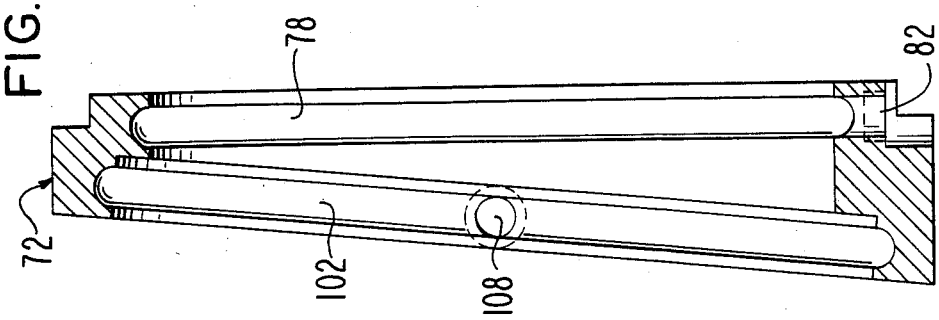
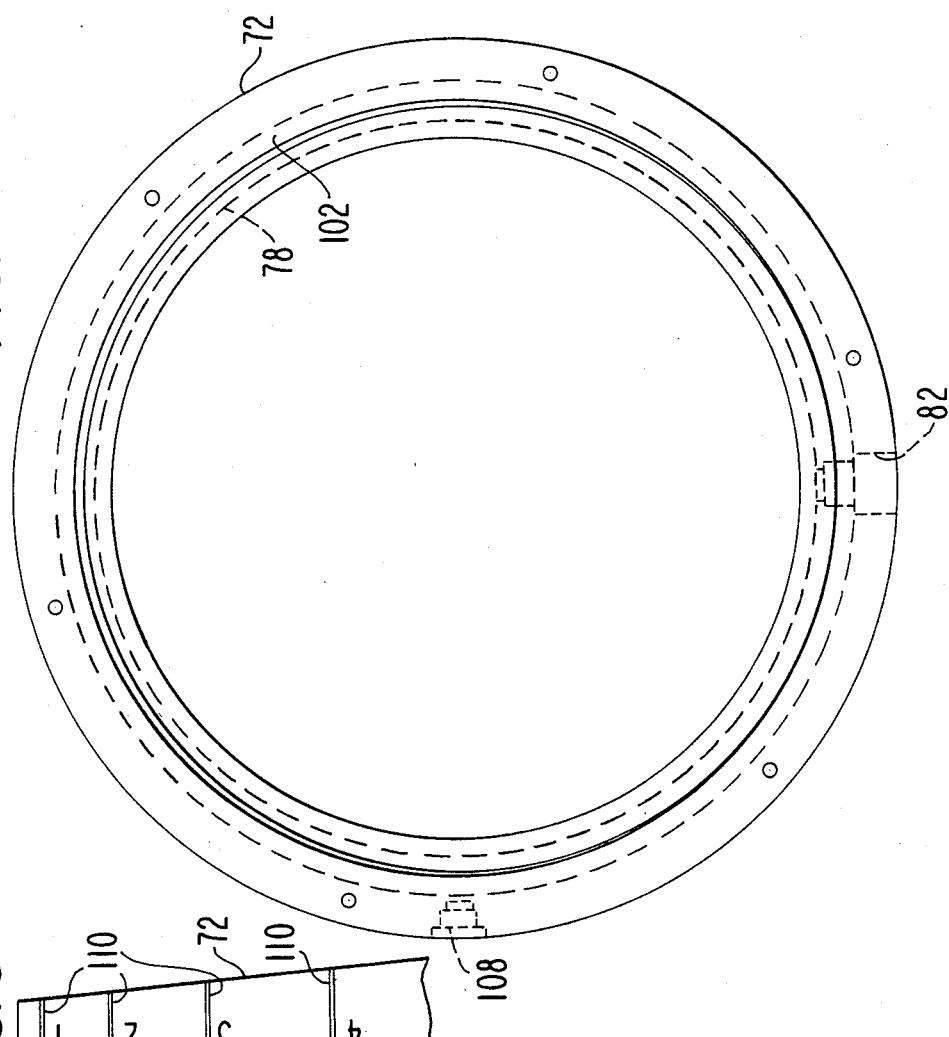
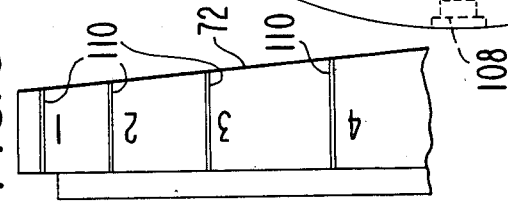

ADJUSTABLE CONNECTOR UNIT

This invention relates to improvements in connectors, especially of the type which adjustably orient a pair of structural parts at an angle with respect to each other, such as a pair of pipes in a fluid system or a pipe and a rod, for instance, in a vacuum system.

BACKGROUND OF THE INVENTION

In many structural applications, such as in a vacuum system or the like, it is desirable that two structural members, such as a pair of tubes or pipes, be selectively oriented at a precise angle with respect to each other. To achieve such orientation is oftentimes a difficult task if the two parts to be oriented must be rigidly connected together, such as by welding or soldering. Such a task requires a considerable expenditure of time and effort. If the two structural parts are not properly oriented with respect to each other, the connection between the parts must be broken and the parts once again connected when the proper orientation appears to be achieved once again.

All of the foregoing requires laborious concentration to detail because of possibly having to duplicate the effort several times to couple a pair of structural parts together. It is important to try to keep such effort to a minimum without sacrificing precision and accuracy in coupling the structural parts together. Because of the foregoing drawbacks of conventional techniques of connecting two structural parts together, a need exists for improvements in hardware for coupling a pair of structural parts together while allowing the orientation of the parts to be changed as desired or needed. The present invention satisfies this need.

SUMMARY OF THE INVENTION

The present invention is directed to a connector unit which has two side members generally aligned with each other. The side members are adapted to be coupled to and to provide supports for a pair of structural parts which are adapted to be oriented with respect to each other at a given orientation. For instance, a first pipe can be coupled to and extend outwardly from one of the side members and a second pipe can be coupled to and extend outwardly from the other side members with, for instance, the two pipes being in fluid communication with each other if the side members have bores therethrough which communicate with each other.

The connector unit includes a ring for each side member, respectively, the rings being rotatably mounted on and surrounding respective side members, the rings being wedge-shaped in diametrical cross-section and provided with adjacent, contiguous side faces which rotate relative to each other. Each ring is rotatably mounted on and coupled with the respective side member by a set of balls in a race formed by a pair of mating grooves in each ring and its side member. Each set of balls is fed into the corresponding race through a hole in the corresponding ring. The hole is then plugged to retain the balls in the race, whereupon the ring is not only rotatable relative to the corresponding end member but is coupled thereto.

The rings themselves are interconnected by another set of balls in another race formed by grooves in contiguous surfaces of the rings, this race being at an angle relative to the planes of the races coupling the members to respective rings. Thus, upon rotation of one ring relative to the other ring, the side members coupled to the one ring will be changed in its angular orientation relative to the second side member yet the side members will not rotate relative to each other and move toward or away from each other.

The present invention therefore provides a connector unit which can be easily and quickly connected to a pair of structural parts to be adjustably oriented at an angle relative to each other. The connector unit is simple and rugged in construction, is simple to assemble, and can be made with inexpensive parts and in various sizes depending upon the application to which the connector unit is to be put.

The primary object of the present invention is to provide an improved connector unit for coupling a pair of structural parts wherein the connector unit allows a change in the angular orientation of one part relative to the other part without rotating the parts and without moving the parts toward or away from each other, all of which can be accomplished quickly and easily with a relatively few number of quickly assembled components.

Other objects of this invention will become apparent as the following specification progresses, reference being had to the accompanying drawings for an illustration of the invention.

IN THE DRAWINGS

FIG. 1 is a side elevational view of a connector unit of the present invention;

FIG. 2 is a vertical section through the connector unit of FIG. 1;

FIG. 3 is a vertical section through one of the rotatable rings of the connector unit, showing the grooves for receiving mounting balls for coupling the ring to an adjacent side member and another ring;

FIG. 4 is a side elevational view of the ring of FIG. 3;

FIG. 5 is a fragmentary, and elevational view of the ring of FIGS. 3 and 4, showing a number of scale markings on the outer surface thereof.

Figure 8:
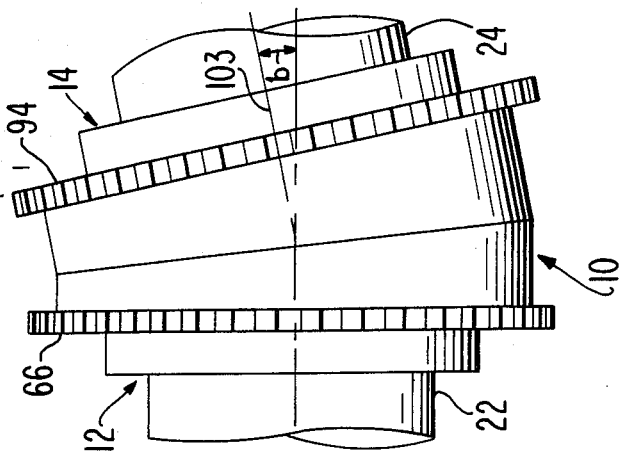
FIGS. 6–8 show end elevational views of the connector unit showing the way it can be adjusted to orient a pair of pipes in different angular positions relative to each other.

The connector unit of the present invention is broadly denoted by the numeral 10 and includes a pair of spaced, generally annular side members 12 and 14 (FIG. 2) which are generally aligned with each other and, for purposes of illustration, have respective bores 16 and 18 therethrough defining a fluid or other passage 20 through the connector unit 10. Members 12 and 14 are adapted to be coupled in any suitable manner to a pair of structural parts, such as pipes or tubes which extend outwardly therefrom. For purposes of illustration, pipes 22 and 24 shown in dashed lines in FIG. 2 are secured to and extend outwardly from respective side members 12 and 14. The connector unit can be used, for instance, to interconnect the pipes 22 and 24 when the pipes are to be axially aligned with each other or when one pipe has its central axis at an acute angle relative to the central axis of the other pipe.

A bellows 26 is mounted in the space 28 between members 12 and 14 to allow for tilting one member relative to the other member. Bellows 26 is typically used when connector unit 10 is to form part of a vacuum system to provide a fluid seal between side members 12 and 14.

Bellows 26 has a bellows body 30 and a pair of annular end flanges 32 and 34 secured to bellows body 30. Flanges 32 and 34 are mounted in bores 16 and 18, respectively, in any suitable manner, such as by welding or other means.

Member 12 has a cylindrical outer surface 36 provided with an annular groove 38 therein. Groove 38 mates or is radially aligned with a similar groove 40 in the inner periphery 42 of a ring 44 which surrounds member 12 and is rotatable about member 12 in either direction. To couple member 12 with ring 44, a plurality of balls 46 are in rolling relationship in the race defined by the aligned grooves 38 and 40, whereby the ring 44 is rotatable relative to and about member 12 yet ring 44 is essentially locked or connected to member 12.

Ring 44 has a radial hole 48 (FIG. 1) therethrough from the outer periphery 50 thereof to the groove 40 on the inner periphery 42. This hole is in communication with groove 40 and thereby the race formed by aligned grooves 38 and 40 when member 12 and ring 44 are in the relative positions thereof shown in FIG. 2. Bore 40 allows balls 46 to be dropped one-by-one into the race formed by grooves 38 and 40 until the balls fill the race as shown in FIG. 1. Then, a screw 54 is threaded into hole 48 to close the hole and thereby prevent the of balls 46 from falling out. This type of connection therefore assures that ring 44 will not only be connected to member 12 but will also be rotatable with respect to member 12.

To assist in manually rotating ring 44 relative to member 12, a post 56 is mounted in any suitable manner, such as by screws 58, on the outer periphery 36 of member 12 as shown in FIGS. 1 and 2. The post has a bearing 86 at the outer end thereof for rotatably mounting a short shaft 60 provided with a knob 62 at one end thereof and a spur gear 64 at the other end thereof, the spur gear being in mesh with a ring gear 66 secured by screws 68 to the outer periphery of ring 44. A set screw 70 releasably locks shaft 60 against rotation and thereby releasably holds ring 44 in a fixed position relative to member 12.

To rotate ring 44 relative to member 12 in a given direction, screw 70 is backed off, and knob 62 is rotated in a desired direction until ring 44 is in the desired position with respect to member 12. Then the set screw 70 is again locked in place and ring 44 is releasably secured to member 12.

A second ring 72 is rotatably mounted on and connected to side member 14 by balls in the same manner as ring 44 is connected to member 12. To this end, member 14 has on its outer periphery 74 a groove 76 which mates or is radially aligned with the annular groove 78 in the inner periphery of ring 72. Grooves 76 and 78 define a race in which a plurality of balls 80 are placed to allow rotation of ring 72 relative to member 14 while interconnecting member 14 and ring 72. The race defined by grooves 76 and 78 is in a plane substantially parallel to the plane of the race defined by grooves 38 and 40.

Ring 72 has a hole 82 therein (FIG. 3) for allowing the insertion of balls 80 in the race defined by grooves 76 and 78. Once the balls 80 are in place, hole 82 is plugged by a screw similar to screw 54. Thus, balls 80 not only permit rotation of ring 72 in either direction about member 14 but also releasably interconnect member 14 and ring 72.

Member 14 is provided with a post 84 having a bearing 86 therethrough for mounting a shaft 88. A knob 90 is on one end of shaft 88 and a spur gear 92 is on the opposite end of the shaft, the spur gear being in mesh with a ring gear 94 secured in any suitable manner, such as by screws, to the outer periphery of ring 72. A set screw 96 releasably locks shaft 88 against rotation relative to post 84. Thus, by rotating spur gear 92 relative to post 84, the position of ring 72 relative to member 14 can be selectively changed.

When balls 80 are in place, ring 72 is not only rotatably mounted on member 14 but is coupled to the ring as a unit. Rotation of knob 90 will cause rotation of spur gear 92 to, in turn, cause ring gear 94 and ring 72 to rotate in a specific direction with reference to member 14. When properly positioned, ring 72 is releasably held in place by set screw 96 which bears against shaft 88.

Ring 44 and ring 72 are rotatably coupled together by a plurality of balls 98 which are shiftably received within a race defined by a pair of mating, aligned grooves 100 and 102, groove 100 being in an outer peripheral surface 104 of ring 44 (FIG. 2) and groove 102 being in an inner peripheral surface 106 of ring 72. Grooves 100 and 102 and the race formed by these grooves are in a plane which is at an angle with respect to the planes of the races in which balls 46 and 80 are disposed. This is shown in FIG. 3 wherein groove 102 is angled with reference to groove 78 in ring 72. This angle could be in the range of 0° to 45°.

To accommodate the angled race defined by grooves 100 and 102, the contiguous side faces 99 and 101 of rings 44 and 72 are also angled. These faces 99 and 101 are in planes parallel to the plane of the race defined by grooves 100 and 102.

Ring 72 has a hole 108 (FIGS. 1 and 4) therein to allow balls 98 to be fed into the race defined by grooves 100 and 102 when rings 44 and 72 are in their operative positions as shown in FIG. 2. Hole 108 is plugged with a screw 109 when balls 98 are in place in the corresponding race.

Figure 6:
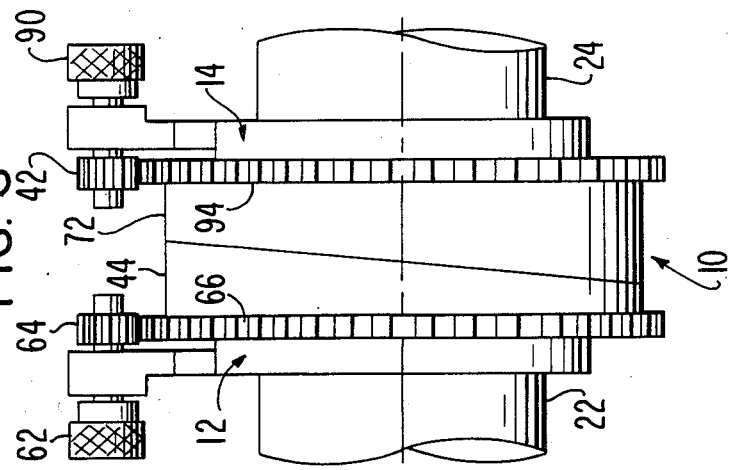

In use, the connector unit can be adapted for any one of a number of different applications. For purposes of illustration, FIG. 6 shows the way in which the connector unit 10 is used to interconnect the pair of pipes 22 and 24 shown in FIG. 2. In assembling connector unit 10, it is assumed that ring 44 is first coupled to member 12, following which ring 72 is coupled to member 14. Finally, rings 44 and 72 are connected together, the three connections being achieved by insertion of balls 46, 80 and 98 in respective races formed by the various grooves in members 12 and 14 and rings 44 and 72.

Figure 7:
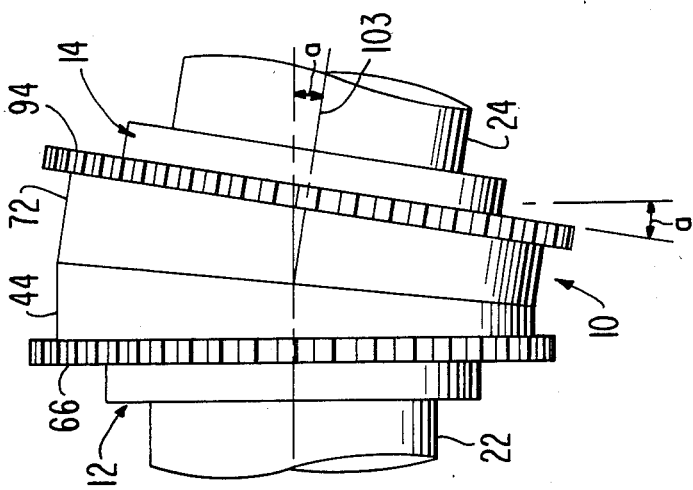

Assuming pipes 22 and 24 are initially in the axially aligned positions of FIG. 6, if it is desired, for instance, to orient pipe 24 at an angle a with respect to the central axis 22a of pipe 22, then knob 90 is rotated to cause rotation of ring 72 relative to ring 44. The rotation will be about an axis 103 (FIGS. 2 and 7) which is inclined with respect to axis 22a, the angle of inclination being angle a. This axis 103 is generally perpendicular to the plane of the race defined by grooves 100 and 102, such plane being denoted by the numeral 105 in FIG. 2.

The rotation of ring 72 relative to ring 44 is caused by rotating knob 90 in a desired direction when set screw is backed off from engagement with shaft 88. When the desired angle a is reached, set screw 96 is again rotated into engagement with shaft 88, thereby fixing ring 72 relative to flange 14. It is possible, of course, that ring 44 could have been rotated relative to ring 72 to achieve the same purpose.

FIG. 8 shows the relative positions of pipes 22 and 24 when ring 44 is rotated relative to ring 72 and as pipe 22 remains in a fixed position with its central axis generally horizontal. In such a case, the central axis of pipe 24 will be at an angle b with respect to the central axis of pipe 22.

To facilitate adjusting ring 72 relative to ring 44, each of the rings is provided with graduated marks 110 thereon as shown in FIG. 5. These marks are equally spaced apart.

I claim:

1. A connector unit comprising:
 a pair of spaced side members, each side member adapted to be coupled to a respective one of a pair of structural parts to be interconnected;
 a ring for each side member, respectively, each ring being in at least partially surrounding relationship to the respective side member;
 first ball means rotatably coupling each side member with its respective ring to allow the ring to rotate relative to the side member about a first axis; and
 second ball means rotatably coupling the rings together to allow the rings to rotate relative to each other about a second axis at an angle with respect to the first axis of rotation of each ring relative to its corresponding side member, whereby rotation of one ring relative to the other member will cause the side member corresponding to the one ring to be moved to an angular position relative to the other side member.

2. A connector unit as set forth in claim 1, wherein said angle is in the range of 0° to 45°.

3. A connector unit as set forth in claim 1, and including means carried by each side member, respectively, for manually rotating the respective ring.

4. A connector unit as set forth in claim 3, wherein said rotating means includes a ring gear on each ring, respectively, a spur gear in mesh with each ring gear, respectively, and means coupled with the spur gear for mounting the spur gear on a respective side member.

5. A connector unit as set forth in claim 1, wherein said mounting means includes a post rigid to the outer periphery of each side member, respectively, and a shaft journaled on the post, the spur gear being on one end of the shaft, and a knob on the opposite end of the shaft.

6. A connector unit as set forth in claim 5, wherein each ring gear is on the outer periphery of the corresponding ring in surrounding relationship to the respective side member.

7. A connector unit as set forth in claim 6, wherein the axis of rotation of each spur gear is parallel to the central axis of the side members.

8. A connector unit as set forth in claim 1, wherein the side members are spaced apart, there being a bellows between the side members for providing a fluid seal therebetween.

9. A connector unit as set forth in claim 8, wherein the side members have aligned, respective bores therethrough, said bellows including a bellows body provided with a pair of end flanges, the end flanges being in the bores in sealing relationship to the respective side members.

10. A connector unit comprising:
 a pair of spaced side members, each side member adapted to be coupled to a respective one of a pair of structural parts to be interconnected;
 a ring for each side member, respectively, each ring being in at least partially surrounding relationship to the respective side member, each side member and its respective ring having surface means defining a race;
 a plurality of balls in each race, respectively, in rolling relationship thereto for rotatably coupling the respective side member with its respective ring to allow the ring to rotate relative to the side mexber about a first axis; and
 second means rotatably coupling the rings together to allow the rings to rotate relative to each other about a second axis at an angle with respect to the first axis of rotation of each ring relative to its corresponding side member, whereby rotation of one ring relative to the other member will cause the side member corresponding to the one ring to be moved to an angular position relative to the other side member.

11. A connector unit as set forth in claim 10, wherein each ring is provided with a hole therethrough extending inwardly from the outer periphery thereof, the hole communicating with the corresponding race to allow the corresponding balls to be inserted into the race, and means for closing the hole after the balls are in place in the race.

12. A connector unit comprising:
 a pair of spaced side members, each side member adapted to be coupled to a respective one of a pair of structural parts to be interconnected;
 a ring for each side member, respectively, each ring being in at least partially surrounding relationship to the respective side member;
 first means rotatably coupling each side member with its respective ring to allow the ring to rotate relative to the side member about a first axis;
 means defining a continuous race between the rings; and
 a plurality of balls in the race in rolling relationship thereto, said balls locking the rings together but permitting rotation of the rings relative to each other about a second axis at an angle with respect to the first axis of rotation of each ring relative to its corresponding side member, whereby rotation of one ring relative to the other mexber will cause the side member corresponding to the one ring to be moved to an angular position relative to the other side member.

13. A connector unit as set forth in claim 12, wherein the rings are provided with respective, aligned grooves defining said race therebetween, the plane of the race being at an angle relative to the plane of rotation of each ring relative to its respective side member.

14. A connector unit as set forth in claim 13, wherein the race between the rings is formed by one of said grooves in an outer peripheral surface portion of one of the rings, the other groove being on an inner peripheral portion of the other ring, there being a hole through the other ring from the outer periphery thereof to the groove on the inner periphery thereof for receiving the balls for insertion into the race, and means for closing the hole in said other ring.

15. A connector unit comprising:
 a pair of spaced, annular side members having a common central axis, each side member adapted to be coupled to a respective one of a pair of structural parts to be interconnected;
 a ring for each side member, respectively, each ring being in at least partially surrounding relationship to the respective side member;

first means rotatably coupling each side member with its respective ring to allow the ring to rotate relative to the side member about a first axis;

second means rotatably coupling the rings together to allow the rings to rotate relative to each other about a second axis at an angle with respect to the first axis of rotation of each ring relative to its corresponding side member, whereby rotation of one ring relative to the other member will cause the side member corresponding to the one ring to be moved to an angular position relative to the other side member;

a ring gear on the outer periphery of each ring, respectively, in surrounding relationship to the respective side member;

a spur gear in mesh with each ring gear, respectively, the axis of rotation of each spur gear being parallel to the common central axis of said side members;

a post rigid to the outer periphery of each side member, respectively;

a shaft journaled on each post, respectively, each spur gear being on one end of a respective shaft; and a knob being on the opposite end of each shaft, respectively, whereby each ring can be rotated by rotating the respective knob.

* * * * *